3,840,558
THIENO(2,3-EPSILON) (1,4)DIAZEPINE COMPOUNDS
Michio Nakanishi, Oita, and Kazuhiko Araki, Tetsuya Tahara, and Masami Shiroki, Fukuoka, Japan, assignors to Yoshitomi Pharmaceutical Industries, Ltd., Osaka, Japan
No Drawing. Filed Apr. 10, 1972, Ser. No. 242,768
Claims priority, application Japan, Apr. 9, 1971, 46/22,408; May 11, 1971, 46/31,870
Int. Cl. A61k 27/00; C07d 65/14
U.S. Cl. 260—329 S     16 Claims

ABSTRACT OF THE DISCLOSURE

Thieno[2,3-e][1,4]diazepine compounds of the general formula:

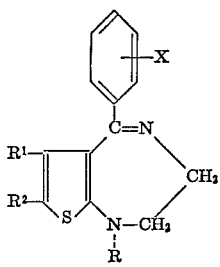

wherein X is H, halogen, methyl or methoxy; each of $R^1$ and $R^2$ is H or $C_{1-4}$ alkyl, or $R^1$ and $R^2$ combinedly form $-(CH_2)_4-$; and R is H, $C_{1-4}$ alkyl or a group of the formula $-C(=Y)NHR^3$ where Y is oxygen or sulfur and $R^3$ is $C_{1-4}$ alkyl or aryl; and pharmaceutically acceptable acid addition salts thereof are useful as psychotropics.

---

This invention relates to novel and therapeutically valuable thieno[2,3-e][1,4]diazepine compounds of the general formula:

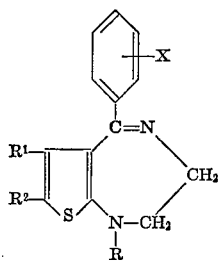

and pharmaceutically acceptable acid addition salts thereof, wherein X is H, halogen (e.g. F, Cl or Br), methyl or methoxy; each of $R^1$ and $R^2$ is H or $C_{1-4}$ alkyl such as methyl, ethyl, propyl, butyl or isobutyl, or $R^1$ and $R^2$ combinedly form $-(CH_2)_4-$; and R is H, $C_{1-4}$ alkyl or a group of the formula $-C(=Y)NHR^3$ where Y is oxygen (O) or sulfur (S) and $R^3$ is $C_{1-4}$ alkyl or aryl (e.g. phenyl, chlorophenyl or tolyl).

The compounds of general formula (I) can be produced by one of the methods (i) and (ii):

(i) In the case of compounds of general formula (I) wherein R is H or $C_{1-4}$ alkyl, a compound of the formula

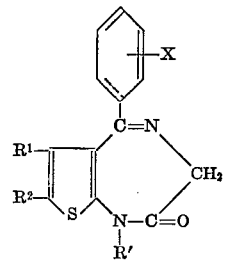

wherein R' is H or $C_{1-4}$ alkyl and other symbols are defined above, is subjected to reduction, by the use of a complex metal hydride such as lithium aluminum hydride, sodium aluminum hydride or $$NaAl(OCH_2CH_2OCH_3)_2H_2$$

The reduction is usually carried out in an inert solvent such as ethyl ether, butyl ether, tetrahydrofuran, dioxane, benzene, toluene, xylene, or a mixture thereof, at a temperature of from about 0° C. to reflux temperature, for several minutes to ten-odd hours.

(ii) In the case of compounds of general formula wherein R is a group of the formula $-C(=Y)NHR^3$, a compound produced by the method (i) and having the formula

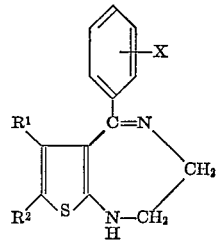

wherein each symbol is defined as above, is reacted with a compound of the formula $$R^3-NCY \qquad\qquad (IV)$$

wherein each symbol is defined as above.

The reaction in method (ii) is usually carried out in an inert solvent such as benzene, toluene, xylene, carbon tetrachloride, dichloromethane, chloroform, or a mixture thereof, at a temperature of from 0° C. to reflux temperature, for about one to ten-odd hours.

The starting compounds of formula (II) can be prepared, for example, by the method disclosed in Published West Germany Patent Application OLS-2,107,356, namely by subjecting a compound of the formula

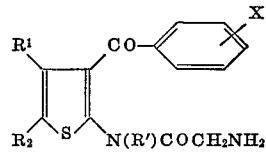

to intramolecular condensation.

The compounds of formula (I) can be converted into the corresponding acid addition salts in a conventional manner by treatment with various inorganic and organic acids, for example, hydrochloric, hydrobromic, nitric, sulfuric, citric, maleic, fumaric, succinic, oxalic and tartaric acid.

The compounds of formula (I) and the pharmaceutically acceptable acid addition salts thereof are excellent in anticonvulsant action, antimegimide effect and reserpine potentiation as shown, for example, by the following tests.

(1) Anticonvulsant action

A test solution containing a test compound was intraperitoneally administered to one group of 6 dd-strain mole mice each weighing 20–25 g. After an hour, a silver electrode of an electroshock seizure apparatus (designed by L. A. Woodbury et al.: see, Archives Internationales de Pharmacodynamie et de Therapie, vol. 42, pp. 72–102 (1952)) was brought into contact with the cornea and an alternating current (2000 volts, 12.5 milliamperes) was applied for 0.2 second to induce convulsion. The $ED_{50}$, the dose required to lower the seizure rate by 50% against the control mice, was determined from the dose-effect correlation curve.

(2) Antimegimide effect

A test solution containing a test compound was orally administered to one group of 6 dd-strain male mice. After 15 minutes, a solution of 80 mg./kg. of megimide ($\beta$-ethyl-$\beta$-methylglutarimide) was subcutaneously administered. The $ED_{50}$, the dose required to prevent for 3 hours the death due to the tonic extensor convulsion induced by the administration of megimide in 50% of the test animals, was determined from the does-effect correlation curve.

(3) Reserpine potentiation

A test solution containing a test compound was orally administered to one group of 4 dd-strain female mice. After 30 minutes, a solution of 10 mg./kg. of reserpine was intraperitoneally administered, and the degree of blepharoptosis of both eyes was observed 15, 60, 120 and 180 minutes after the administration of reserpine. The $PD_{30}$, the dose required to potentiate by 30% the effect of reserpine 15 minutes after the administration of reserpine, was determined from the dose-effect correlation curve.

RESULTS

| Compound | A | B | C | D |
|---|---|---|---|---|
| Action: | | | | |
| Anticonvulsant action $ED_{50}$, mg./kg. | 58 | 30 | 90 | 60 |
| Antimegimide effect $ED_{50}$, mg./kg. | 30 | 17 | 140 | 90 |
| Reserpine potentiation $PD_{30}$, mg./kg. | 40 | 40 | 28 | 20 |

NOTE.—Compounds A to D are identified below:
A = 5-o-chlorophenyl-7-ethyl-1,2-dihydro-3H-thieno[2,3-e][1,4]-diazepine.
B = 1-methyl-5-o-chlorophenyl-7-ethyl-1,2-dihydro-3H-thieno[2,3-e][1,4]diazepine hydrochloride monohydrate.
C = 1-methylcarbamoyl-5-o-chlorophenyl-7-ethyl-1,2-dihydro-3H-thieno[2,3-e][1,4]diazepine.
D = 1-butylcarbamoyl-5-o-chlorophenyl-7-ethyl-1,2-dihydro-3H-thieno[2,3-e][1,4]diazepine hydrochloride.

In view of various tests, including those mentioned above, the compounds of the invention represented by formula (I) and pharmaceutically acceptable acid addition salts thereof can be safely administered as psychotropics for the treatment of epilepsy, neurosis, schizophrenia and depression, in the form a pharmaceutical preparation with a suitable and conventional pharmaceutically acceptable carrier or adjuvant, administrable, orally, without harm to the patients.

The pharmaceutical preparations can take any conventional form such as tablets, capsules or powders.

FORMULATION EXAMPLES (a) 10 mg. tablets are prepared from the following compositions:

| | Mg. |
|---|---|
| Compound (I) | 10 |
| Starch | 8.5 |
| Mircocrystalline cellulose | 10 |
| Lactose | 50 |
| Methyl cellulose | 0.5 |
| Magnesium stearate | 1 |
| | 80 |

(b) 10% powders are prepared from the following compositions:

| | Percent by weight |
|---|---|
| Compound (I) | 10 |
| Lactose | 80 |
| Starch | 9.5 |
| Methyl cellulose | 0.5 |
| | 100 |

The daily dose of compound (I) or a salt thereof for human adults usually ranges from about 30 to 60 mg., in single or multiple dose, but it may be changed depending upon the age and/or symptoms of the patients.

The present invention will be better understood from the following examples which are illustrative and not limitative of the present invention.

EXAMPLE 1

To a suspension of 1.8 g. of lithium aluminum hydride in 30 ml. of anhydrous tetrahydrofuran is added dropwise, with stirring and cooling to below 30° C., a solution of 8 g. of 5-o-chlorophenyl-1,2,6,7,8,9-hexahydro - 3H - [1] benzothieno[2,3-e][1,4]diazepin-2-one in 20 ml. of tetrahydrofuran, and the whole mixture is stirred at room temperature for 5 hours, and then refluxed for 5 minutes. Then the excess lithium aluminum hydride in the reaction mixture is decomposed with water and dilute aqueous sodium hydroxide solution. The insoluble matter is filtered off, and the filtrate is concentrated. The residue is dissolved in chloroform, the chloroform solution is washed with water, and then dried over anhydrous magnesium sulfate, and the solvent is distilled off under reduced pressure. The residue is crystallized from petroelum ether to give 5-o-chlorophenyl-1,2,6,7,8,9-hexahydro-3H-[1] benzothieno[2,3-e][1,4]diazepine as yellow crystals, in 84% yield, melting at 228–229° C. (after recrystallization from benzene).

EXAMPLE 2

10 ml. of 64% (w./v.) benzene solution of $$NaAl(OCH_2CH_2OCH_3)_2H_2$$

is added to 10 ml. of anhydrous benzene. To this benzene solution is added dropwise, with stirring and cooling to below 30° C., 5 g. of 5-o-chlorophenyl-7-ethyl-1,2-dihydro-3H-thieno[2,3-e][1,4]diazepin-2-one, and the whole mixture is stirred at room temperature for 20 minutes, and then refluxed for 5 minutes. Then the excess $NaAl(OCH_2CH_2OCH_3)_2H_2$ in the reaction mixture is decomposed with water and dilute aqueous sodium hydroxide solution. The insoluble matter is filtered off, the benzene phase is washed with water, and dried over anhydrous magnesium sulfate, and the solvent is distilled off under reduced pressure. The residue is crystallized from a mixture of petroleum ether and a small amount of dichloromethane to give 5-o-chlorophenyl-7-ethyl-1,2-dihydro-3H-thieno[2,3-e][1,4]diazepine as yellow crystals, in 90% yield, melting at 178–179° C. (after recrystalization from a mixture of petroleum ether and dichloromethane).

Using the procedure set forth in the above examples, but substituting equivalent amounts of the appropriate starting materials, the following compounds are also produced:

| Example No. | $R^1$ | $R^2$ | R | X | Melting point (° C.) |
|---|---|---|---|---|---|
| 3 | H | Ethyl | H | H | 190–191 |
| 4 | H | Methyl | H | o-Cl | 205–206 |
| 5 | Methyl | Methyl | H | H | 203–205 |
| 6 | H | Ethyl | Methyl | o-Cl | [1] 247–248 |
| 7 | H | Ethyl | H | o-CH$_3$ | 185–186 |
| 8 | H | Ethyl | H | o-CH$_3$O | 177–178 |

[1] Hydrochloride hydrate.

EXAMPLE 9

3 ml. of methyl isocyanate is added to a solution of 5.5 g. of 5-o-chlorophenyl-7-ethyl-1,2-dihydro-3H-thieno [2,3-e][1,4]diazepine in 30 ml. of chloroform, and the whole mixture is refluxed for 6 hours. After cooling, the reaction mixture is washed with water, and dried over anhydrous magnesium sulfate, and the solvent is distilled off under reduced pressure. The residue is crystallized from a mixture of petroleum ether and a small amount of ethanol to give 1 - methylcarbamoyl-5-o-chlorophenyl-7-ethyl - 1,2 - dihydro-3H-thieno-[2,3-e][1,4]diazepine as white crystals, in 83% yield, melting at 137–138° C. (after recrystallization from a mixture of chloroform and petroleum ether).

EXAMPLE 10

2.5 g. of methyl isothiocyanate is added to a solution of 7.8 g. of 5 - o-chlorophenyl-7-ethyl-1,2-dihydro-3H-thieno[2,3-e][1,4]diazepine in 50 ml. of chloroform, and the whole mixture is refluxed for 6 hours. After cooling, the reaction mixture is washed with water, and dried over anhydrous magnesium sulfate, and the solvent is distilled off under reduced pressure. The residue is dissolved in ethyl acetate, and the organic solution is treated with 30% ethanolic hydrochloric acid to give 1-methylthiocarbamoyl - 5 - o-chlorophenyl-7-ethyl-1,2-dihydro-3H-thieno [2,3-e][1,4]diazepine hydrochloride as yellow crystals, in 67% yield, melting at 155–156° C. (after recrystallization from methanol).

Using the procedure set forth in the above examples, but substituting equivalent amounts of the appropriate starting materials, the following compounds are also produced:

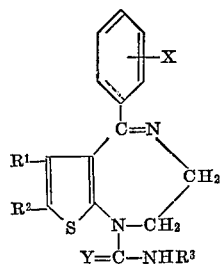

| Example No. | $R^1$ | $R^2$ | $R^3$ | Y | X | Melting point (° C.) |
|---|---|---|---|---|---|---|
| 11 | H | Ethyl | o-Chlorophenyl | O | o-Cl | 128–130 |
| 12 | Methyl | Methyl | Methyl | O | H | 225–227 |
| 13 | H | Ethyl | Butyl | O | o-Cl | [1] 201 |
| 14 | —(CH$_2$)$_4$— | | Methyl | O | o-Cl | 190–191 |
| 15 | H | Ethyl | Methyl | O | o-CH$_3$ | [1] 207–208 |
| 16 | H | Ethyl | Methyl | O | o-CH$_3$O | [1] 213–214 |

[1] Hydrochloride.

Although the present invention has been adequately discussed in the foregoing specification and examples included therein, one readily recognizes that various changes and modifications may be made without departing from the spirit and scope thereof.

What is claimed is:

1. A thieno[2,3-e][1,4]diazepine compound of the general formula:

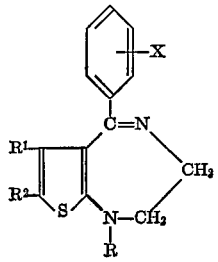

wherein X is H, halogen, methyl or methoxy; each of $R^1$ and $R^2$ is H or $C_{1-4}$ alkyl; and R is H, $C_{1-4}$ alkyl or a group of the formula —C(=Y)NHR$^3$ where Y is oxygen or sulfur and R$^3$ is $C_{1-4}$ alkyl or a member selected from the group consisting of phenyl, chlorophenyl, and tolyl and a pharmaceutically acceptable acid addition salt thereof.

2. The compound of claim 1: 5-o-chlorophenyl-7-ethyl-1,2-dihydro-3H-thieno[2,3-e][1,4]diazepine.

3. The compound of claim 1: 5-phenyl-7-ethyl-1,2-dihydro-3H-thieno[2,3-e][1,4]diazepine.

4. The compound of claim 1: 5-o-chlorophenyl-7-methyl-1,2-dihydro-3H-thieno[2,3-e][1,4]diazepine.

5. The compound of claim 1: 5-phenyl-6,7-dimethyl-1,2-dihydro-3H-thieno[2,3-e][1,4]diazepine.

6. The compound of claim 1: 1-methyl-5-o-chlorophenyl-7-ethyl-1,2-dihydro-3H-thieno[2,3-][1,4]diazepine.

7. The compound of claim 1: 5-o-tolyl-7-ethyl-1,2-dihydro-3H-thieno[2,3-e][1,4]diazepine.

8. The compound of claim 1: 5 - o-methoxyphenyl-7-ethyl-1,2-dihydro-3H-thieno[2,3-e][1,4]diazepine.

9. The compound of claim 1: 1-methylcarbamoyl-5-o-chlorophenyl - 7-ethyl-1,2-dihydro-3H-thieno[2,3-e][1,4]-diazepine.

10. The compound of claim 1: 1-methylthiocarbamoyl-5 - o-chlorophenyl - 7-ethyl-1,2-dihydro-3H-thieno[2,3-e][1,4]-diazepine.

11. The compound of claim 1: 1-o-chlorophenylcarbamoyl - 5-o-chlorophenyl-7-ethyl-1,2-dihydro-3H-thieno[2,3-e][1,4]diazepine.

12. The compound of claim 1: 1-methylcarbamoyl-5-phenyl - 6,7-dimethyl-1,2-dihydro-3H-thieno[2,3-e][1,4]-diazepine.

13. The compound of claim 1: 1-butylcarbamoyl-5-o-chlorophenyl - 7-ethyl-1,2-dihydro-3H-thieno[2,3-e][1,4]-diazepine.

14. The compound of claim 1: 1-methylcarbamoyl-5-o - chlorophenyl - 1,2,6,7,8,9-hexahydro-3H-thieno[2,3-e][1,4]-diazepine.

15. The compound of claim 1: 1-methylcarbamoyl-5-o-tolyl - 7 - ethyl-1,2-dihydro-3H-thieno[2,3-e][1,4]diazepine.

16. The compound of claim 1: 1-methylcarbamoyl-5-o-methoxyphenyl - 7 - ethyl-1,2-dihydro-3H-thieno[2,3-e][1,4]-diazepine.

References Cited

UNITED STATES PATENTS

| 3,669,959 | 6/1972 | Hromatka et al. | 260—239.3 |
| 3,558,606 | 1/1971 | Tinney | 260—239.3 |
| 3,121,075 | 2/1964 | Keller et al. | 260—239 |
| 3,120,521 | 2/1964 | Sternbach et al. | 260—244 |
| 3,678,036 | 7/1972 | Archer et al. | 260—239 |

FOREIGN PATENTS

| 1,225,677 | 3/1971 | Great Britain | 260—239 |

HENRY R. JILES, Primary Examiner

C. M. S. JAISLE, Assistant Examiner

U.S. Cl. X.R.

260—329 F, 332.2 R, 332.3 P, 332.5; 424—295